United States Patent Office 2,820,807
Patented Jan. 21, 1958

2,820,807

TRIFLUOROMETHYL THIOL ESTERS

Eugene H. Man, Brookside Park, Del., assignor to E. I. du Pont de Nemours and Company, Wilmington, Del., a corporation of Delaware No Drawing. Application October 5, 1955
Serial No. 538,778

5 Claims. (Cl. 260—455)

This invention relates to new organic compounds and more particularly to new esters.

Trifluoromethanethiol, $CF_3SH$, has but recently been described (Haszeldine and Kidd, J. Chem. Soc. 1953, 3219–3225).

This invention has as an object the preparation of new intermediates. Another object is the preparation of new condensation resin components. A further object is the preparation of new starting materials for fluorocarbon production. Other objects will appear hereinafter.

These objects are accomplished by the present invention of the new compounds of the formula

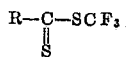

wherein R is fluorine or the trifluoromethylthio radical, $CF_3S$. These new compounds are therefore, on the one hand, trifluoromethyl fluorodithioformate,

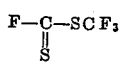

and, on the other hand, bis (triflouromethyl) trithiocarbonate,

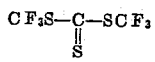

Both compounds are trifluoromethyl thiolesters of one-carbon thiolacids. Thus, they are esters of trifluoromethanethiol with the hypothetical fluorodithioformic acid and with trithiocarbonic acid, respectively.

A further aspect of the present invention is the preparation of these compounds by bringing trifluoromethanethiol in contact with at least a molar equivalent of an alkali metal fluoride, whereby one mole of hydrogen fluoride is removed from each mole of trifluoromethanethiol and absorbed by the alkali metal fluoride, and isolating the trifluoromethyl fluorodithioformate and bis(trifluoromethyl) trithiocarbonate formed.

The reactions that take place in this process may be represented by the equations:

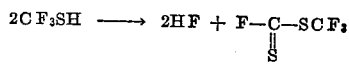

and

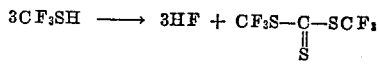

the hydrogen fluoride being absorbed by the alkali metal fluoride which is converted to the acid fluoride, e. g., $NaF \cdot HF$ or $KF \cdot HF$.

The invention is illustrated in greater detail by the following examples. The trifluoromethanethiol used in these examples was prepared from bis(trifluoromethylthio)-mercury as described by Haszeldine and Kidd, loc. cit. It is a gas boiling at $-37°$ C. An improved preparation of bis(trifluoromethylthio)mercury by reacting carbon disulfide and mercuric fluoride at 100–500° C. is described in U. S. Patent 2,729,663, issued January 3, 1956, to E. L. Muetterties.

EXAMPLE I

Trifluoromethanethiol (107 g., 105 moles) was passed at room temperature (20–23° C.) through sodium fluoride pellets (178 g., 4.25 moles) packed in a one-inch copper tube twelve inches long, at the rate of approximately 0.75 mole per hour. The reaction product passed first through a trap cooled at 0° C. then through a trap cooled in carbon dioxide-acetone. The sodium fluoride was found to have absorbed approximately one mole of hydrogen fluoride. The gas condensed in the carbon dioxide-acetone trap was found by infrared analysis to contain 20% of unreacted trifluoromethanethiol, 45–50% of sulfur dioxide and 10% of carbon oxysulfide. The material condensed in the trap at 0° C. gave on distillation 13.8 g. of a yellow liquid boiling at 42° C. at 760 mm., $n_D^{25}$ 1.4010, and 3.0 g. of a dark red residue of bis(trifluoromethyl)trithiocarbonate (see Example II).

The distillate was identified as trifluoromethyl fluorodithioformate by its composition, by its nuclear magnetic resonance spectrum and by its reaction with aniline.

Analysis

Calculated for $C_2F_4S_2$: C, 14.63%; F, 46.34%; S, 39.02%; M. W., 164. Found: C, 13.19%; F, 46.56%; S, 39.63%; M. W., 167.

The nuclear magnetic resonance spectrum indicated two peaks due to fluorine with an intensity ration of 3:1. Infrared spectrum was also consistent with the structure of trifluoromethyl fluorodithioformate.

When 2–3 ml. of aniline was added to about an equal volume of trifluoromethyl fluorodithioformate, a rapid exothermic reaction took place and a solid formed. This solid was separated, washed with dilute hydrochloric acid, then with water, and dried. It melted at 152–155° C. and was identified as diphenylthiourea when no depression was observed by a mixed melting point with an authentic sample of that compound.

EXAMPLE II

Trifluoromethanethiol (130 g., 1.27 moles) was passed through 168 g. (4 moles) of sodium fluoride pellets as described in Example I. There was condensed 22 g. of crude reaction product in the trap at 0° C. The more volatile material, trapped in the carbon dioxide-acetone trap, was evaporated, and the vapors were passed through the sodium fluoride a second time, giving an additional 14.2 g. reaction product and a volatile material condensed in the carbon dioxide-acetone trap. The latter was again vaporized through a fresh charge of sodium fluoride pellets under the same conditions, giving 14.6 g. of reaction product.

The combined crude products (50.8 g.) were distilled, giving 35.9 g. (34.2% yield) of trifluoromethyl fluorodithioformate boiling at 40.5–42° C. at 760 mm. and 8.4 g. of residue. The combined residues of several preparations were distilled at 61–63° C. at 78 mm. pressure. This product, a dark red liquid, was identified as bis-(trifluoromethyl)trithiocarbonate by means of its nuclear magnetic spectrum (one peak due to fluorine), its infrared spectrum, showing no contradictory evidence, and its elemental analysis.

Analysis

Calculated for $C_3F_6S_3$: C, 14.63%; F, 46.34%; S, 39.02%. Found: C, 14.44%; F, 45.86%; S, 37.76%.

In the above-exemplified method of preparing the products of this invention, sodium fluoride can be replaced by other alkali metal fluorides forming acid fluorides, for example potassium fluoride. It is desirable to use the alkali metal fluoride in amounts of at least one mole per mole of trifluoromethanethiol, and preferably in amounts in excess thereover.

The reaction temperature is not particularly critical, since the dehydrofluorination of trifluoromethanethiol by the alkali metal fluoride takes place, to some extent at least, even at very low temperatures such as −25° C. or even lower. However, the reaction proceeds faster at temperatures above about 0° C., and preferably between 15 and 75° C.

As has been shown, the operation can be made continuous or semi-continuous by separating the reaction products from the unreacted material and recirculating the latter over the alkali metal fluoride. Batch operations or continuous operations can be carried out at superatmospheric pressure if desired.

The reaction products are most conveniently isolated by condensing them out of the effluent gas, then subjecting them to fractional distillation at ordinary or reduced pressure.

In addition to the reaction of trifluoromethanethiol with alkali metal fluoride, other methods of preparing one of the products of this invention, viz., bis(trifluoromethyl)-trithiocarbonate, have been discovered. These are illustrated in the following examples.

EXAMPLE III

Bis (trifluoromethyl)trithiocarbonate was prepared by the reaction of trifluoromethyl fluorodithioformate with bis(trifluoromethylthio)mercury as follows: A mixture of 20 g. (0.05 mole) of bis(trifluoromethylthio)mercury and 16.4 g. (0.1 mole) of trifluoromethyl fluorodithioformate was allowed to stand at room temperature for about 16 hours. As there was no significant evidence of reaction, the solution was then heated to reflux (about 50° C.) for six hours, during which time it turned dark red. The reaction product was distilled, giving a small foreshot and 6 g. of bis(trifluoromethyl)trithiocarbonate, B. P. 64° C. at 82 mm. pressure, and further identified by its molecular weight (found, 240, 250; calculated, 246). A solid residue remained, consisting of unreacted bis(trifluoromethylthio)mercury and mercuric fluoride.

EXAMPLE IV

Bis(trifluoromethyl)trithiocarbonate was prepared from trifluoromethanethiol and sodium as follows: Trifluoromethanethiol (79 g., 0.77 mole) containing traces of hydrogen chloride as an impurity was passed into a dispersion of approximately 0.5 gram atom of sodium in dry xylene. The reaction mixture was maintained at 55–60° C. during the 4.5 hours required for the addition of the trifluoromethanethiol. A solid reaction product was collected by filtration in a closed system and was washed with xylene and dry ether. This product (61 g.) was a brown solid which reacted violently with water. Analysis by flame spectrophotometer showed 25.5% sodium, and 45 minutes later 30.5% sodium, indicating that the sodium trifluoromethylmercaptide presumably present was rapidly decomposing, even in a dry atmosphere. X-ray analysis of the solid showed lines identified as those of sodium fluoride, sodium hydrogen fluoride and sodium chloride.

The liquid filtrate from this reaction gave on fractionation 16.3 g. of bis(trifluoromethyl)trithiocarbonate, B. P. 46–51° C. at 80 mm. pressure. This represented a 28% yield based on the trifluoromethanethiol.

The products of this invention have a variety of uses. For example, both products are useful as intermediates in the preparation of thioureas by reaction with primary or secondary amines. Thioureas have in turn various uses, such as the preparation of valuable synthetic resins by condensation with aldehydes. The two products of this invention are also useful in the synthesis of fluorocarbons, particularly tetrafluoroethylene, by reaction with carbon at high temperatures, as described in U. S. Patent 2,709,-189 and in its continuation-in-part, application Ser. No. 508,576, filed by M. W. Farlow and E. L. Muetterties on May 16, 1955.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A trifluoromethyl ester of the formula

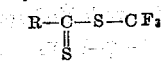

wherein R is selected from a group consisting of fluorine and trifluoromethylthio.

2. Trifluoromethyl fluorodithioformate.
3. Bis(trifluoromethyl)trithiocarbonate.
4. The process which comprises bringing trifluoromethanethiol in contact with an alkali metal fluoride and isolating a member of the group consisting of trifluoromethyl fluorodithioformate and bis(trifluoromethyl)trithiocarbonate.
5. The process which comprises bringing trifluoromethanethiol in contact with sodium fluoride and isolating a member of the group consisting of trifluoromethyl fluorodithioformate and bis(trifluoromethyl)trithiocarbonate.

No references cited.